(12) United States Patent
Takahashi et al.

(10) Patent No.: US 10,763,559 B2
(45) Date of Patent: Sep. 1, 2020

(54) METAL-AIR BATTERY

(71) Applicant: FUJIKURA RUBBER LTD., Koto-ku, Tokyo (JP)

(72) Inventors: Masaki Takahashi, Saitama (JP); Tsutomu Narita, Saitama (JP); Yoshiharu Nakajima, Saitama (JP); Hiroshi Sakama, Saitama (JP)

(73) Assignee: FUJIKURA RUBBER LTD., Tokyo (JP)

(*) Notice: Subject to any disclaimer, the term of this patent is extended or adjusted under 35 U.S.C. 154(b) by 64 days.

(21) Appl. No.: 16/072,253

(22) PCT Filed: Jul. 28, 2016

(86) PCT No.: PCT/JP2016/072225
§ 371 (c)(1),
(2) Date: Jul. 24, 2018

(87) PCT Pub. No.: WO2017/130441
PCT Pub. Date: Aug. 3, 2017

(65) Prior Publication Data
US 2019/0036187 A1    Jan. 31, 2019

(30) Foreign Application Priority Data
Jan. 26, 2016    (JP) .................. 2016-012628

(51) Int. Cl.
*H01M 12/06* (2006.01)
*H01M 12/02* (2006.01)

(52) U.S. Cl.
CPC ......... *H01M 12/065* (2013.01); *H01M 12/02* (2013.01); *H01M 12/06* (2013.01)

(58) Field of Classification Search
None
See application file for complete search history.

(56) References Cited

U.S. PATENT DOCUMENTS

| | | | |
|---|---|---|---|
| 3,982,944 A | 9/1976 | Ohi et al. | |
| 2005/0019651 A1* | 1/2005 | Tsai | H01M 10/42 |
| | | | 429/72 |
| 2014/0087274 A1 | 3/2014 | Tzidon et al. | |

FOREIGN PATENT DOCUMENTS

| | | |
|---|---|---|
| CN | 102041521 A | 5/2011 |
| CN | 104106157 A | 10/2014 |

(Continued)

OTHER PUBLICATIONS

International Search Report for Application No. PCT/JP2016/072225 dated Aug. 30, 2016.

(Continued)

*Primary Examiner* — Karie O'Neill Apicella
(74) *Attorney, Agent, or Firm* — McCormick, Paulding & Huber PLLC (57) ABSTRACT

An object is especially to provide a metal-air battery that ensures a high output and continuance of the output over a long period of time as compared with a conventional one. A metal-air battery in the present invention includes a case, air electrodes disposed on both sides of the case, and a plurality of metal electrodes disposed inwardly separately from the air electrodes. The metal electrodes are opposed to one another via a space (S). The metal-air battery of the present invention can inhibit the reaction product from depositing between the air electrode and the metal electrode. A degree of freedom of a distance between the air electrode and the metal electrode is high. As described above, the high output and the continuance of the output over a long period of time are ensured.

9 Claims, 7 Drawing Sheets

(56) References Cited

FOREIGN PATENT DOCUMENTS

| JP | S50-110337 A | | 8/1975 | |
|---|---|---|---|---|
| JP | S50-110337 A | | 9/1975 | |
| JP | S50-145423 A | | 12/1975 | |
| JP | S50-154746 A | | 12/1975 | |
| JP | S50-156724 A | | 12/1975 | |
| JP | S51-78923 A | | 6/1976 | |
| JP | S51-138836 A | | 11/1976 | |
| JP | S58-44766 A | | 3/1983 | |
| JP | 2005-515606 A | | 5/2005 | |
| JP | 2015-099740 A | | 5/2015 | |
| JP | 2015099740 A | * | 5/2015 | ............ H01M 12/06 |
| JP | 2015-207494 A | | 11/2015 | |
| JP | 2017-004644 A | | 1/2017 | |

OTHER PUBLICATIONS

Office Action for Taiwan Patent Application No. 105125404 dated Dec. 13, 2019.

* cited by examiner

METAL-AIR BATTERY

CROSS-REFERENCE TO RELATED APPLICATIONS

This application is a National Stage application of International Patent Application No. PCT/JP2016/072225 filed on Jul. 28, 2016, which claims priority to Japanese Patent Application No. JP2016-012628 filed on Jan. 26, 2016, each of which is hereby incorporated by reference in its entirety.

TECHNICAL FIELD

The present invention relates to a metal-air battery, and especially relates to a structure of a metal electrode that is a negative electrode.

BACKGROUND ART

In a metal-air battery, oxygen in the atmosphere is used as a positive-electrode active material to perform redox reaction of this oxygen at an air electrode that is a positive electrode. On the other hand, redox reaction of metal is performed at a metal electrode that is a negative electrode. The metal-air battery has a high energy density, thus being expected as a role such as an emergency power supply at the time of disaster or the like.

The air electrodes are disposed, for example, on both sides of a housing, and the metal electrode is opposed to the air electrodes via an electrolyte (see FIG. 1 in JP-A-2015-99740). In the metal-air battery described in JP-A-2015-99740, the metal electrode is configured of a current collector and electrode active materials formed on both sides of the current collector.

SUMMARY OF THE INVENTION

A conventional structure of the metal-air battery has the following problem. That is, a reaction product generated by battery reaction deposits between the air electrode and the metal electrode. This results in a problem of decrease in continuousness of a predetermined output due to decrease in the battery reaction.

As the metal-air battery described in Patent Document 1, the configuration where the air electrodes are disposed on both sides and the metal electrode is disposed between the air electrodes has a low degree of freedom of a distance between the air electrode and the metal electrode, thus having a problem that a sufficiently high output cannot be obtained.

The present invention has been made in consideration of such points, and an object of the present invention is especially to provide a metal-air battery that ensures a high output and continuance of the output over a long period of time as compared with a conventional one.

A metal-air battery in the present invention includes a case, air electrodes disposed on both sides of the case, and a plurality of metal electrodes disposed inwardly separately from the air electrodes. The metal electrodes are opposed to one another via a space.

In the present invention, the case is divided into a plurality of cases. The metal electrodes are disposed in the respective different cases, and at least one of the respective metal electrodes is disposed inside an opposing portion of the case. The plurality of cases are combined such that the opposing portions are opposed to one another to form the space between the metal electrodes.

Specifically, as one example, the metal-air battery includes a first case and a second case that have outside frame bodies and inside frame bodies as the opposing portions, a first air electrode disposed on the outside frame body of the first case, a first metal electrode disposed on a side of the inside frame body of the first case, a second air electrode disposed on the outside frame body of the second case, and a second metal electrode disposed on a side of the inside frame body of the second case. At least one of the first metal electrode and the second metal electrode is disposed inside the inside frame body. The first case and the second case are combined such that the inside frame bodies are faced inward to form the space between the first metal electrode and the second metal electrode.

In the present invention, the air electrode may be formed into a tubular shape, or the air electrode may have a shape where a part of the tubular shape is chipped.

A metal-air battery in the present invention includes a case, an air electrode disposed in the case, and a metal electrode disposed inwardly separately from the air electrode. The air electrode has a tubular shape or a shape where a part of the tubular shape is chipped. The metal electrode has a tubular shape or a shape where a part of the tubular shape is chipped. The metal electrode has a tubular inside as a space.

In the present invention, it is preferable that the metal electrode is removably mounted on the case. In the present invention, it is preferable that the metal electrode has a slit or a hole passing from an inside to an outside of the metal electrode.

In the present invention, it is preferable that the metal electrode has one end portion and another end portion, the one end portion is a fixed end fixed to a side of the case, and the other end portion is a free end.

In the present invention, a metal that constitutes the metal electrode is, although not specifically limited, for example, magnesium or a magnesium alloy.

The metal-air battery of the present invention can inhibit the reaction product from depositing between the air electrode and the metal electrode. The degree of freedom of the distance between the air electrode and the metal electrode is high. As described above, the high output and the continuance of the output over a long period of time are ensured as compared with the conventional one.

DETAILED DESCRIPTION

The following describes one embodiment (hereinafter, abbreviated as "the embodiment") of the present invention in detail. The present invention is not limited to the following embodiment and can be performed in various modifications in a range of the gist of the present invention.

First Embodiment

Figure 1A:
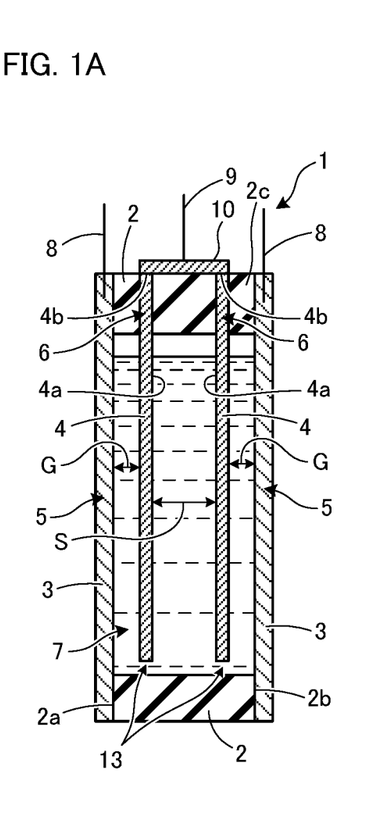
FIG. 1A and FIG. 1B include schematic diagrams (vertical cross-sectional views) of a metal-air battery in a first embodiment of the present invention.
Figure 1B:
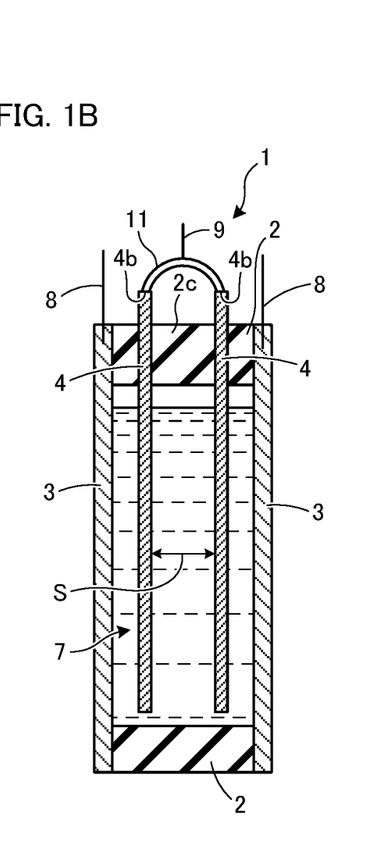

FIG. 1 includes schematic diagrams (vertical cross-sectional views) of a metal-air battery in a first embodiment of the present invention. The vertical cross section refers a cutting surface cut along a height direction of a case. The same applies hereafter. As illustrated in FIG. 1A, a metal-air battery 1 is configured including a case 2, air electrodes 3, and metal electrodes 4. The air electrodes 3 are disposed on both sides of the case 2. The metal electrodes 4 are disposed inwardly separately from the air electrodes 3. The air electrode 3 is a positive electrode. The metal electrode 4 is a negative electrode.

The case 2 has an electrical insulating property. The case 2 is formed of, for example, a plastic resin or a paper configured to prevent leakage of an electrolyte. The case 2 has a first side surface 2a and a second side surface 2b on which respective opening windows 5 are formed. The plurality of air electrodes 3 are fixed to respective frames of the first side surface 2a and the second side surface 2b. At this time, an outer surface of each air electrode 3 is aerially exposed through the opening window 5.

For example, a vertical dimension, a lateral dimension, and a height dimension of a case appearance are a few cm to tens of cm. The case 2 has a shape that is, for example, a rectangular parallelepiped, a cube, a circular cylinder, or a rectangular cylinder. The case 2 may be configured alone, or may be configured such that a plurality of parts are combined. The dimensions, the shape, and the like of the case 2 are not especially limited.

The case 2 illustrated in FIG. 1A has insertion holes 6 at a ceiling 2c. The metal electrode 4 is insertable into an inside of the case from the outside of the metal-air battery 1 through the insertion hole 6.

As illustrated in FIG. 1A, the metal electrode 4 is disposed inside the air electrode 3. A predetermined interval (gap) G is provided between the air electrode 3 and the metal electrode 4. The interval G is, for example, 0.5 to 20 mm, preferably, 0.5 to 5 mm, and further preferably, 0.5 to 2.5 mm. Insofar as the interval G is 0.5 mm or more, a reaction product deposits between the metal electrode 4 and the air electrode 3, thus not damaging the air electrode 3 and the metal electrode 4. Insofar as the interval G is 20 mm or less, preferably, 5 mm or less, and further preferably, 2.5 mm or less, a sufficient output can be obtained. The intervals G are adjusted to be approximately identical between the air electrodes 3 and the metal electrodes 4 on right and left both sides illustrated in FIG. 1A in order to obtain a stable output.

Although shapes of the air electrode 3 and the metal electrode 4 are not limited, for example, the shapes of the air electrode 3 and the metal electrode 4 are thin flat plates whose main surfaces are rectangular, square, or the like.

As illustrated in FIG. 1A, the air electrode 3 is electrically coupled to a positive electrode terminal 8. The metal electrode 4 is coupled to a negative electrode terminal 9.

As illustrated in FIG. 1A, the air electrode 3 is opposed to the metal electrode 4 via an electrolyte 7. The air electrode 3 and the metal electrode 4 both contact the electrolyte 7.

When the metal-air battery 1 illustrated in FIG. 1 is a magnesium-air battery, oxidation reaction indicated by following (1) occurs at the proximity of the metal electrode 4. Reduction reaction indicated by following (2) occurs at the air electrode 3. As the entire magnesium-air battery, reaction indicated by following (3) occurs, thus discharging.

$$2Mg \rightarrow 2Mg^{2+} + 4e^- \quad (1)$$

$$O_2 + 2H_2O + 4e^- \rightarrow 4OH^- \quad (2)$$

$$2Mg + O_2 + 2H_2O \rightarrow 2Mg(OH)_2 \quad (3)$$

For example, as illustrated in Patent Document 1, a conventional metal-air battery has a configuration where the air electrodes are disposed on both sides of the case and the metal electrode is disposed on an approximately center position of the case. However, such a configuration has a problem in continuousness of the predetermined output since the reaction product by the battery reaction deposits between the air electrode and the metal electrode. There is also a problem that the degree of freedom of the distance between the air electrode and the metal electrode is low, thus not obtaining the sufficiently high output.

Therefore, the inventors have arrived at an establishment of a metal-air battery that can inhibit deposition of the reaction product between the air electrode and the metal electrode, compared with the conventional one, by improving a structure of the metal electrode. That is, as illustrated in FIG. 1A, in the first embodiment, the plurality of metal electrodes 4 are disposed, and these metal electrodes 4 are opposed to one another via a space S. The space S communicates with a clearance 13 provided between the metal electrode 4 and the case 2. Here, "the space" refers a three-dimensional extent that can be filled with the electrolyte 7, not filled with the current collector or the like as in Patent Document 1, between inner surfaces (opposing surfaces) 4a of the metal electrodes 4.

Thus, the space S is available as a region where the reaction product can deposit such that the metal electrodes 4 are opposed to one another via the space S. That is, with the embodiment, the reaction product can be smoothly transferred from the clearance 13 provided between the metal electrode 4 and the case 2 to a side of the inner surface 4a of the metal electrode 4, thus improving a dispersibility of the reaction product inside the case 2. Accordingly, an amount of the deposition of the reaction product between the air electrode 3 and the metal electrode 4 can be reduced compared with the conventional one.

In the embodiment, a degree of freedom of the interval G between the air electrode 3 and the metal electrode 4 can be increased such that the plurality of metal electrodes 4 are opposed to one another via the space S. Accordingly, each interval G between the air electrode 3 and the metal electrode 4 can be narrowed to obtain the high output.

In the embodiment, the electrolyte 7 can be injected into the space S such that the metal electrodes 4 are opposed to one another via the space S. Thus, a capacity of the electrolyte 7 can be increased. Consequently, the electrolyte 7 required for the battery reaction can be sufficiently held. This can keep the high output and the output over a long period of time. Especially, in accordance with downsizing of the metal-air battery 1, the configuration in the embodiment is effective.

In the structure illustrated in FIG. 1A, the two metal electrodes 4 are coupled to one another at positions of upper ends 4b with a conductive plate-shaped coupling portion 10. Then, the negative electrode terminal 9 is electrically coupled to a position of the coupling portion 10. The coupling portion 10 is fixed and supported to a top surface side of the ceiling 2c of the case 2.

In FIG. 1A, the metal electrodes 4 coupled with the coupling portion 10 is removably supported to the case 2. Therefore, for example, at the time of decrease in output or at the end of the reaction, the metal electrode 4 can be exchanged.

In a configuration illustrated in FIG. 1B, the upper ends 4b of the metal electrodes 4 are electrically coupled to one another with a conductor 11 such as a lead wire. In FIG. 1B, the upper end 4b of the metal electrode 4 protrudes above the ceiling 2c. Then, the upper ends 4b of the metal electrodes 4 are coupled to one another with the conductor 11. Also in the configuration illustrated in FIG. 1B, the metal electrode 4 is removably supported to the case 2.

Second Embodiment

Although the following describes configurations of the metal-air battery other than the first embodiment, there is no change in having a distinctive configuration where the metal electrodes are opposed to one another via the space S. Accordingly, from a second embodiment, a description will be mainly given of different parts other than the distinctive configuration where the metal electrodes are mutually opposed via the space S. From FIG. 2, reference numerals identical to those in FIG. 1 refer parts identical to those in FIG. 1.

Figure 2A:
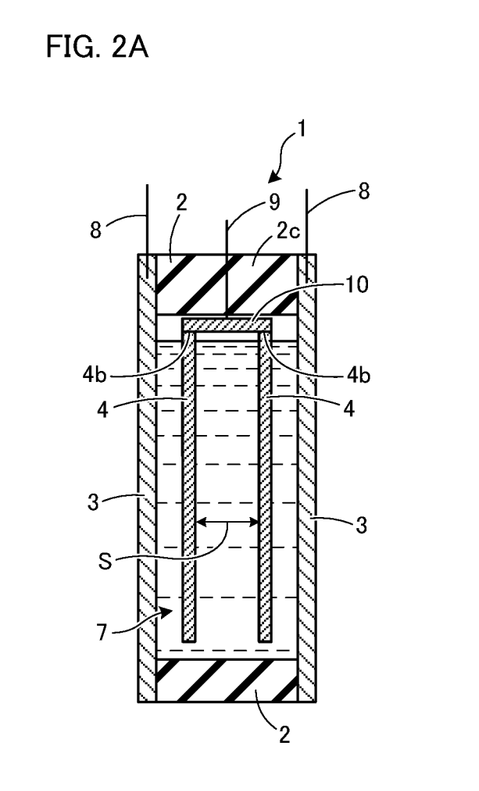
FIG. 2A to FIG. 2C include schematic diagrams (vertical cross-sectional views) of a metal-air battery in a second embodiment of the present invention.
Figure 2B:
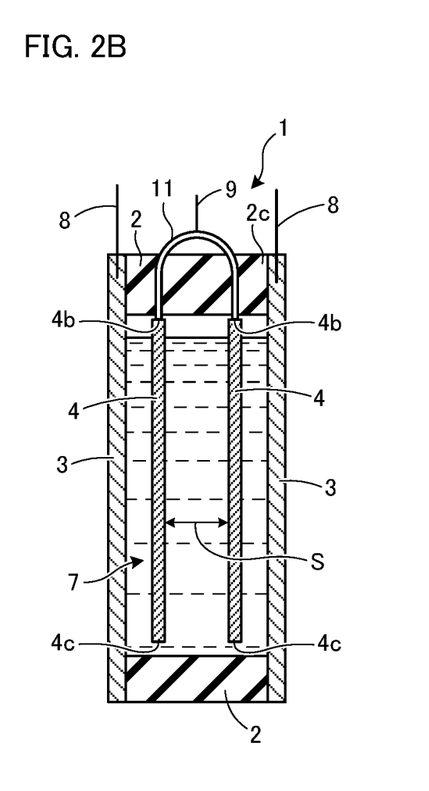

FIG. 2 includes schematic diagrams (vertical cross-sectional views) of a metal-air battery in the second embodiment of the present invention. In FIG. 2A, although the upper ends 4b of the metal electrodes 4 are coupled to one another with the conductive coupling portion 10 similarly to FIG. 1A, the coupling portion 10 is housed in the case 2. In FIG. 2B, although the upper ends 4b of the metal electrodes 4 are electrically coupled to one another with the conductor 11 such as the lead wire similarly to FIG. 1B, the entire metal electrode 4 is housed in the case 2.

Figure 2C:
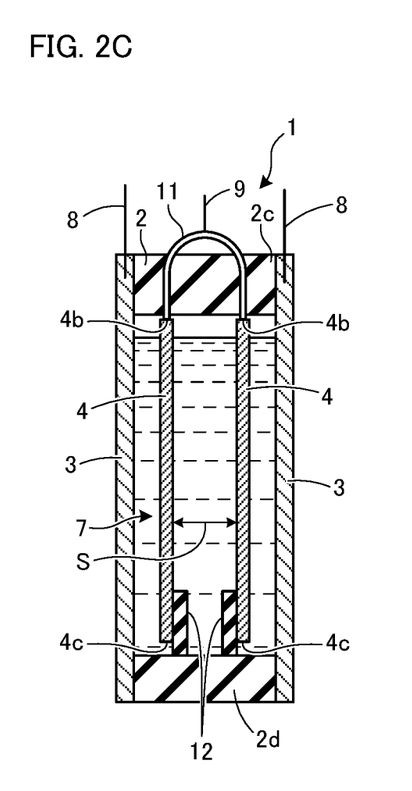

Accordingly, in the embodiment illustrated in FIG. 2, the metal electrode 4 is unremovable with respect to the case 2. Accordingly, FIG. 2 illustrates a disposable metal-air battery 1.

Although FIG. 2C illustrates a disposable metal-air battery 1 similarly to FIG. 2B, lower ends 4c of the metal electrodes 4 are fixed by fixing portions 12 in FIG. 2C. As illustrated in FIG. 2C, the fixing portion 12 projects above from a surface of a bottom surface portion 2d of the case 2. The configuration illustrated in FIG. 2C has a structure where the upper end 4b and the lower end 4c of the metal electrode 4 is directly or indirectly fixed to the case 2. In FIG. 2C, it seems that there is no clearance between the metal electrode 4 and the case 2 in the drawing. However, in practice, a clearance that communicates with the space S is provided, for example, between side surfaces of the metal electrode 4 and the case 2. Then, the reaction product can be transferred from the clearance between the metal electrode 4 and the case 2 to the space S between the metal electrodes 4.

In the configuration in FIG. 2B, similarly to FIG. 2C, a side of the upper end 4b of the metal electrode 4 is fixed to a side of the ceiling 2c of the case 2 via the conductor 11. However, differently from FIG. 2C, the lower end 4c is not fixed. That is, the lower end 4c is configured to be a free end.

Figure 3:
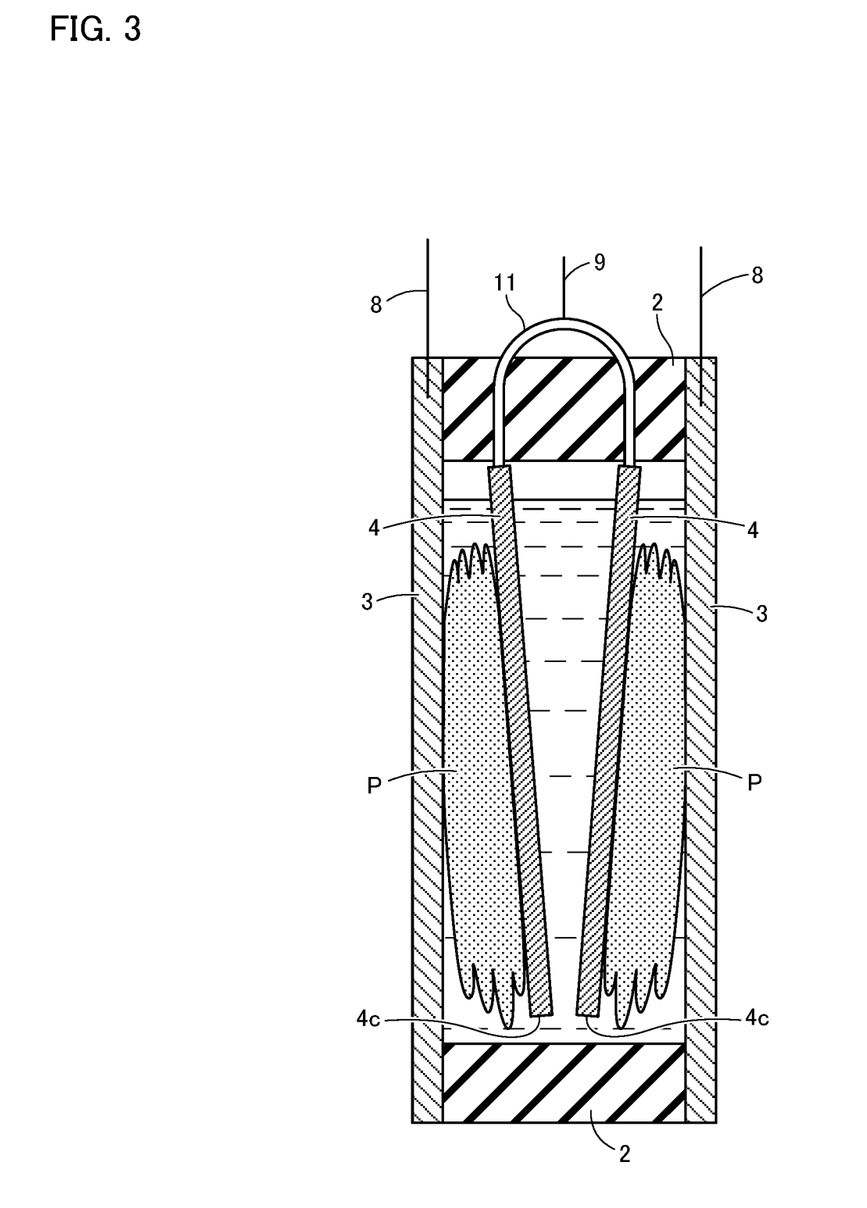
FIG. 3 is a schematic diagram (vertical cross-sectional view) of a metal-air battery to describe a state of a metal electrode by a reaction product in a structure where a lower end of the metal electrode is a free end.

FIG. 3 is a schematic diagram (vertical cross-sectional view) of a metal-air battery to describe a state of a metal electrode by the reaction product in a structure where a lower end of the metal electrode is a free end.

As illustrated in FIG. 3, a side of the lower end 4c of the metal electrode 4 can be swung such that the lower end 4c of the metal electrode 4 is configured to be the free end. In view of this, the lower end 4c side of the metal electrode 4 can be displaced inside upon receiving a pressing force by a reaction product P that has deposited between the air electrode 3 and the metal electrode 4. This can reduce the pressing force to the air electrode 3 and the metal electrode 4 by the reaction product P, thus reducing the damage of the air electrode 3 and the metal electrode 4.

The above-described effect can be appropriately provided also in the configuration of the metal electrode 4 illustrated in FIG. 1.

Third Embodiment

Figure 4:
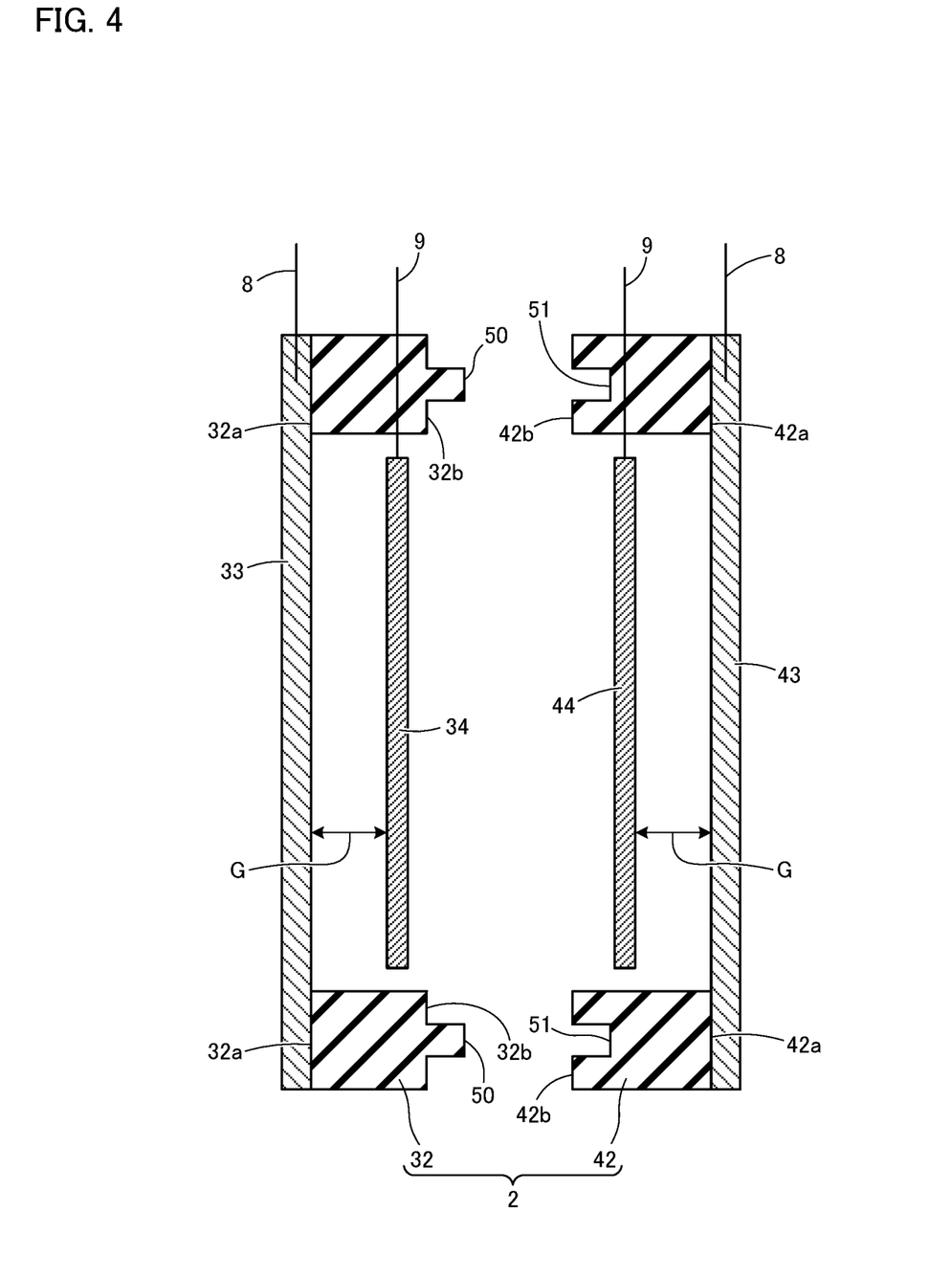
FIG. 4 is a schematic diagram (vertical cross-sectional view) of a metal-air battery in a third embodiment of the present invention.

FIG. 4 is a schematic diagram (vertical cross-sectional view) of a metal-air battery in a third embodiment of the present invention. In FIG. 4, reference numerals identical to those in FIG. 1 and FIG. 2 refer portions identical to those in FIG. 1 and FIG. 2. FIG. 4 illustrates a state before respective cases that constitute the metal-air battery are combined.

As illustrated in FIG. 4, the case 2 is divided into a first case 32 and a second case 42. As illustrated in FIG. 4, the first case 32 includes an outside frame body 32a and an inside frame body 32b that are mutually opposed. Similarly, the second case 42 includes an outside frame body 42a and an inside frame body 42b that are mutually opposed. As illustrated in FIG. 4, a convex portion 50 is formed on the inside frame body 32b of the first case 32. As illustrated in FIG. 4, a concave portion 51 is formed on the inside frame body 42b of the second case 42. Accordingly, the first case 32 has a male-shaped case structure, and the second case 42 has a female-shaped case structure.

As illustrated in FIG. 4, a first air electrode 33 is installed on the outside frame body 32a of the first case 32, and a first metal electrode 34 is installed on a side of the inside frame body 32b of the first case 32. Similarly, a second air electrode 43 is installed on the outside frame body 42a of the second case 42, and a second metal electrode 44 is installed on the inside frame body 42b.

As illustrated in FIG. 4, the first metal electrode 34 is positioned inside the inside frame body 32b (a direction approaching the outside frame body 32a) of the first case 32. Similarly, the second metal electrode 44 is positioned inside the inside frame body 42b (a direction approaching the outside frame body 42a) of the second case 42. Here, "inside the inside frame body" refers being inside a surface of the inside frame body, except for case coupling portions such as the convex portion 50 and the concave portion 51.

Thus, the respective cases 32 and 33 are combined, for example, by convexo-concave fitting such that the inside frame body 32b of the first case 32 is opposed to the inside frame body 42b of the second case 42. Then, similarly to FIG. 1 and FIG. 2, the space S having a predetermined width can be formed between the metal electrodes 34 and 44. The width of the space S can be adjusted by installation positions of the metal electrodes 34 and 44 disposed on the respective cases 32 and 42. Simultaneously, the intervals (gaps) G between the air electrodes 33 and 43 and the metal electrodes 34 and 44 can be adjusted.

Thus, in the metal-air battery in FIG. 4, the case 2 is divided into a plurality of pieces, and the metal electrodes 34 and 44 are disposed on the respective cases 32 and 42. Moreover, the metal electrodes 34 and 44 are disposed inside the inside frame bodies 32b and 42b as opposing portions of the respective cases 32 and 42. This facilitates provision of the desired space S between the metal electrodes 34 and 44 only by incorporation of the respective cases 32 and 42. Although not being limited thereto, the structure in FIG. 4 is especially effective for, for example, a structure where the metal electrodes 34 and 44 are fixed and supported inside the case 2. With the structure where the case 2 is divided, and the divided cases 32 and 42 are combined, the metal electrodes 34 and 44 can be easily and appropriately fixed and supported inside the case 2.

In FIG. 4, both the first metal electrode 34 and the second metal electrode 44 are positioned inside the inside frame bodies 32b and 42b of the respective cases 32 and 42. However, it may have a structure where at least one is positioned inside the inside frame body of the case. This also can form the space S between the metal electrodes 34 and 44 such that respective divided cases are combined.

Differently from FIG. 4, it may be configured to form the space S between the metal electrodes 34 and 44, for example, when the first air electrode 33, the second air electrode 43, the first metal electrode 34, and the second metal electrode 44 are each disposed on an individual case, and the respective cases on which the metal electrodes 34 and 44 are disposed are combined. Alternatively, the air electrode may be configured of a tubular body described later or the like without being divided into a plurality of pieces such as the first air electrode 33 and the second air electrode 43.

Fourth Embodiment

Figure 5A:
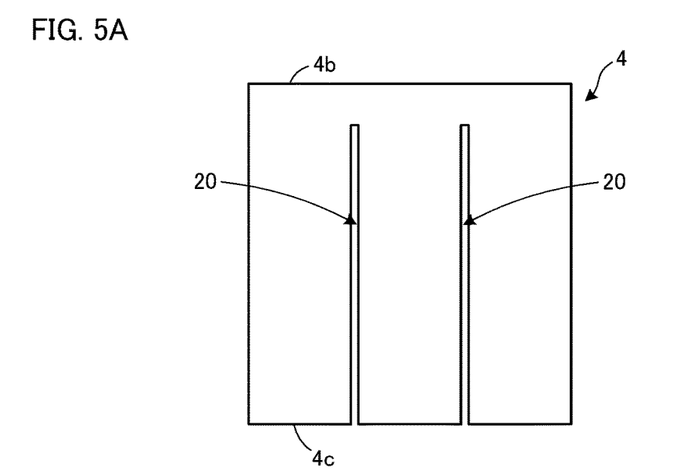
FIG. 5A to FIG. 5C include schematic diagrams (front views) of a metal electrode in a fourth embodiment of the present invention.

FIG. 5 includes schematic diagrams (front views) of a metal electrode in a fourth embodiment of the present invention. As illustrated in FIG. 5A, slits 20 are provided on the metal electrode 4. In FIG. 5A, the number of the slits 20 is two, but the number is not limited. The slit 20 is provided from the lower end 4c of the metal electrode 4 to a midpoint toward the upper end 4b.

Figure 5B:
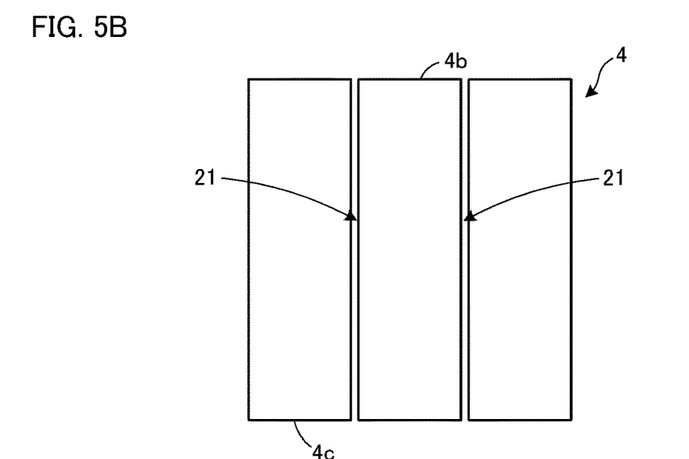

Meanwhile, in FIG. 5B, slits 21 reach the upper end 4b from the lower end 4c of the metal electrode 4. Thus, the metal electrode 4 is disjoined into three strip-shaped pieces. These strip-shaped pieces are coupled, for example, with the coupling portion 10 illustrated in FIG. 1A.

Figure 5C:
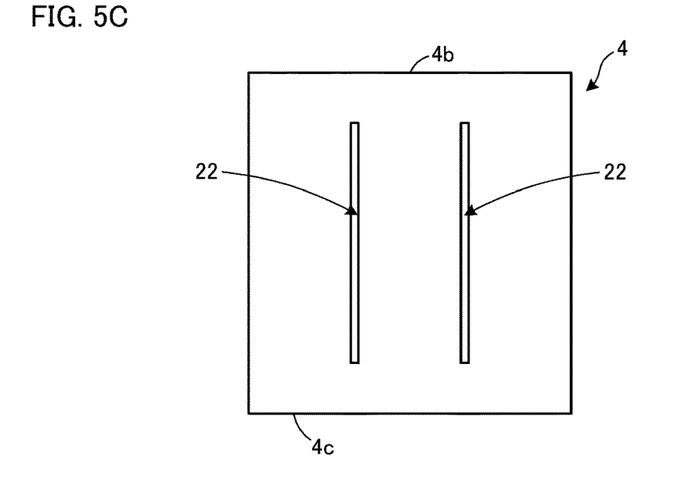

In FIG. 5C, slit-shaped holes 22 are formed on the metal electrode 4. This does not especially limit a shape and the number of the hole 22.

These slits 20 and 21 and hole 22 pass from the inner surface 4a to an outer surface (a surface opposed to the air electrode 3) of the metal electrode 4 illustrated in FIG. 1A.

As illustrated in FIG. 5, provision of the slit and the hole on the metal electrode 4 can smoothly transfer the reaction product to the space S (see, for example, FIG. 1) provided between the metal electrodes 4 through the slit or the hole. Accordingly, the configuration in FIG. 5 can more effectively inhibit the trouble that the reaction product deposits between the air electrode 3 and the metal electrode 4.

The fourth embodiment is applicable to other embodiments.

Fifth Embodiment

Figure 6A:
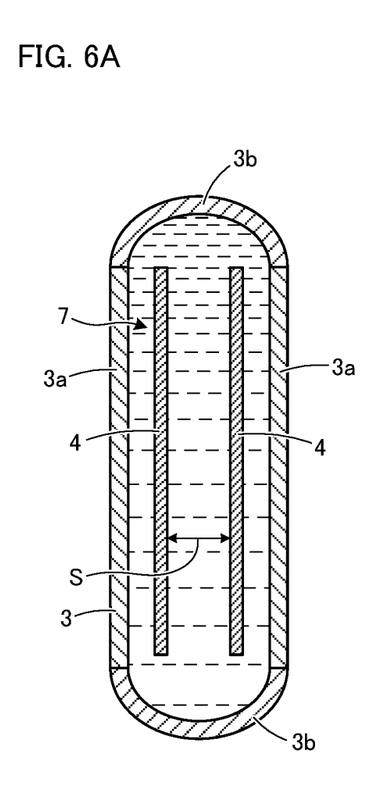
FIG. 6A and FIG. 6B include schematic diagrams (lateral cross-sectional views) of a metal-air battery in a fifth embodiment of the present invention.
Figure 6B:
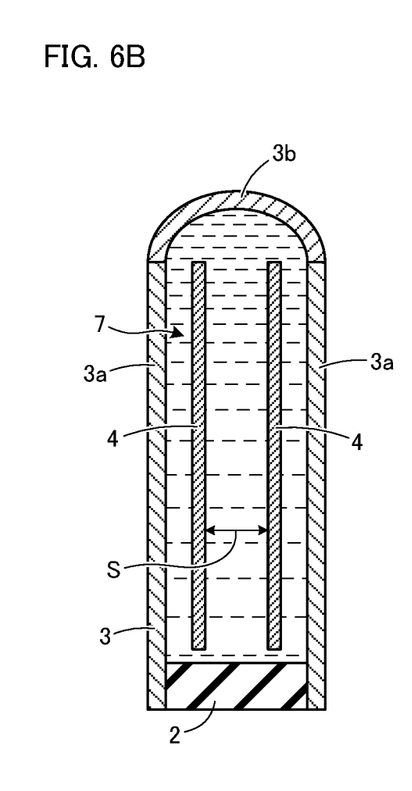

FIG. 6 includes schematic diagrams (lateral cross-sectional views) of a metal-air battery in a fifth embodiment of the present invention. The lateral cross section refers a cross section when a cutting surface cut along a planar direction of the case is viewed from an upper direction.

In FIG. 6A, the air electrode 3 is formed into a tubular shape. On the other hand, the two metal electrodes 4 are disposed inwardly separately from the air electrode 3. The "tubular shape" means a hollow shape, and includes all ones having a ring shape in plan view.

As illustrated in FIG. 6A, the air electrode 3 is configured of opposing portions 3a and coupling portions 3b. The opposing portion 3a is opposed to the metal electrode 4. The coupling portion 3b couples the opposing portions 3a together. The air electrode 3 has an appearance shape that is not limited, but is, for example, a rectangle with rounded corners illustrated in FIG. 6A, a polygon, a circle, or an oval shape. Meanwhile, in a configuration in FIG. 6B, the appearance shape of the air electrode 3 is a shape where a part of the coupling portion 3b of the air electrode 3 illustrated in FIG. 6A is chipped.

In FIG. 6, the air electrode 3 may be configured such that a plurality of parts: the opposing portions 3a and the coupling portions 3b are combined. Alternatively, the air electrode 3 can be formed such that the opposing portions 3a and the coupling portions 3b are integrated.

In the configuration in FIG. 6, a surface area of the air electrode 3 is widely ensured, thus obtaining the high output.

Sixth Embodiment

Figure 7:
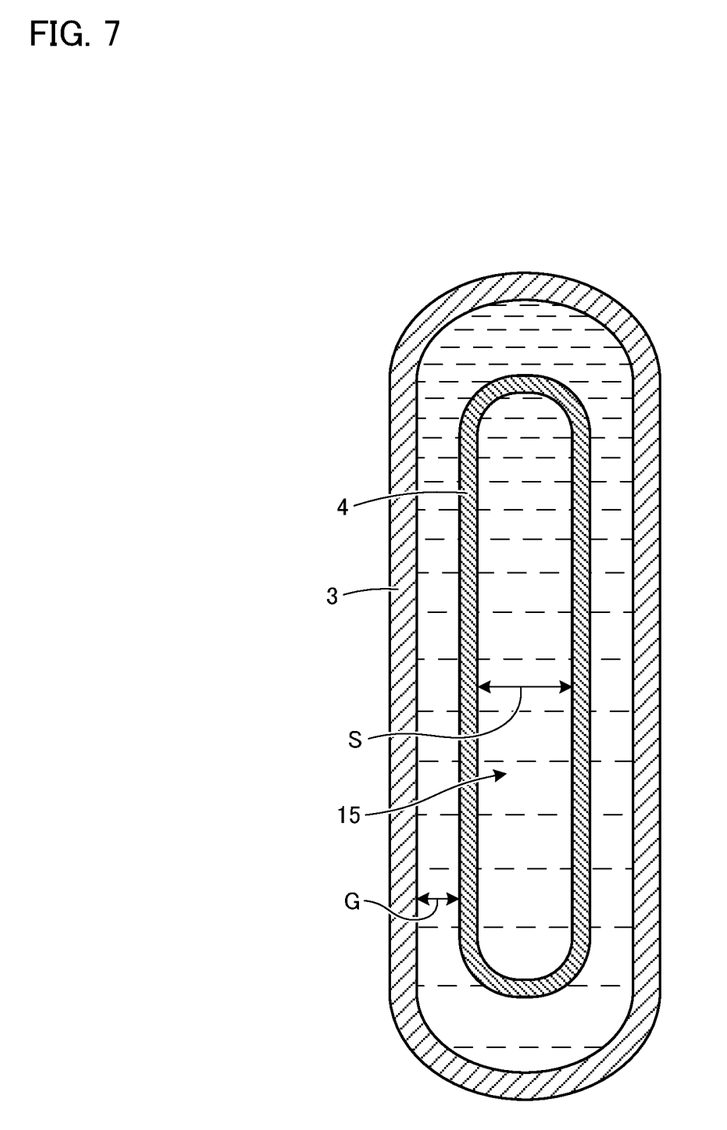
FIG. 7 is a schematic diagram (lateral cross-sectional view) of a metal-air battery in a sixth embodiment of the present invention.

FIG. 7 is a schematic diagram (lateral cross-sectional view) of a metal-air battery in a sixth embodiment of the present invention.

In a configuration illustrated in FIG. 7, both of the air electrode 3 and the metal electrode 4 are formed into tubular shapes. In the configuration illustrated in FIG. 7, similarly to those in FIG. 1, and the like, the air electrode 3 may have a configuration of a plurality of pieces separated into both sides of the case.

In the configuration illustrated in FIG. 7, the metal electrode 4 has a tubular inside 15 that is the space S. It may have a shape where a part of the tubular metal electrode 4 illustrated in FIG. 7 is chipped.

In the configuration illustrated in FIG. 7, a body surface area of the metal electrode 4 opposed to the air electrode 3 is widely ensured. In addition, the interval G between the air electrode 3 and the metal electrode 4 can be narrowly set over a whole circumference. This effectively achieves the high output. Moreover, the tubular inside 15 of the metal electrode 4 is the space S, and the space S communicates with a clearance provided between the metal electrode 4 and the case 2 (for example, a clearance between the lower end of the metal electrode 4 and the case 2). In view of this, the space S can use the tubular inside 15 as a deposit region of the reaction product. Accordingly, this can keep the high output and the output over a long period of time.

<Air Electrode>

Subsequently, a description will be given of a configuration of the air electrode 3. The air electrode 3 can be formed with a laminated structure of a conductive material layer and a current collector. The conductive material layer is an inside layer in contact with the electrolyte housed in the case 2.

The conductive material layer can be formed such that a conductive material is bound with a binder resin. This does not limit the conductive material that constitutes the conductive material layer. It is possible to use all the conventionally known materials that constitute the conductive material layer of the metal-air battery. For example, a preferred conductive material can include carbon materials such as acetylene black, Ketjen black, activated carbon, and carbon nanotube.

The binder resin used for the conductive material layer of the air electrode 3 is not specifically limited. For example, a preferred binder resin can include fluororesin such as polyvinylidene fluoride (PVDF), polytetrafluoroethylene (PTFE), tetrafluoroethylene.hexafluoropropylene copolymer (FEP), ethylene.tetrafluoroethylene copolymer (ETFE), polychlorotrifluoroethylene (PCTFE), ethylene.chlorotrifluoroethylene copolymer (ECTFE), and polyvinyl fluoride (PVF).

The conductive material layer may contain a conventionally known electrode catalyst for a positive electrode of the air-metal battery. For example, the electrode catalyst can exemplify metals such as platinum (Pt), ruthenium (Ru), iridium (Ir), rhodium (Rh), palladium (Pd), osmium (Os), tungsten (W), lead (Pb), iron (Fe), chrome (Cr), cobalt (Co), nickel (Ni), manganese (Mn), vanadium (V), molybdenum (Mo), gallium (Ga), aluminum (Al), and copper (Cu), their compounds, and their alloy.

The current collector layer that constitutes the air electrode 3 is an outside layer in contact with air. The current collector layer can preferably employ, for example, wire netting, expanded metal, fabric, punching sheet, etching foil, and foam that are made of a conductive metallic material.

The conductive metallic material is not specifically limited, but, for example, can include, for example, stainless steel (SUS), copper, and nickel.

<Metal Electrode>

In the embodiment, the material of the metal electrode 4 is not limited, but, is preferably metal such as zinc, aluminum, and magnesium, and their alloy.

It is possible to apply all the conventionally known materials that constitute a negative electrode of the metal-air battery to the alloy.

For example, in the case of the magnesium-air battery, magnesium or a magnesium alloy is used for the metal electrode 4.

In the embodiment, a metal-air battery unit may be configured such that a plurality of metal-air batteries 1 are coupled one another.

With the metal-air battery of the present invention, it is possible to keep the high output over a long period of time compared with the conventional one. Accordingly, the metal-air battery of the present invention is effectively applicable as, for example, an emergency power supply at the time of disaster or the like.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A metal-air battery comprising:
a case;
air electrodes disposed on both sides of the case and connecting with a positive terminal of the battery; and
a plurality of metal electrodes disposed inwardly separated from the air electrodes and connecting with a negative terminal of the battery, the plurality of metal electrodes and the air electrodes connected to the terminals producing battery power when discharging, wherein
an outer surface of the air electrodes is aerially exposed, the metal electrodes are opposed to one another via a first space,
the air electrodes at each side of the case are separated from the plurality of metal electrodes by second and third spaces respectively;
the first space between the metal electrodes and the second and third spaces between the air electrodes and the metal electrodes communicate with each other, and
the first space and the second and third spaces are filled with electrolyte injected into the case.

2. The metal-air battery according to claim 1, wherein:
the case is divided into a plurality of cases,
the metal electrodes are disposed in the respective different cases, and at least one of the respective metal electrodes is disposed inside an opposing portion of the case, and
the plurality of cases are combined such that the opposing portions are opposed to one another to form the space between the metal electrodes.

3. The metal-air battery according to claim 2, comprising:
a first case and a second case that have outside frame bodies and inside frame bodies as the opposing portions;
a first air electrode disposed on the outside frame body of the first case;
a first metal electrode disposed on a side of the inside frame body of the first case;
a second air electrode disposed on the outside frame body of the second case; and
a second metal electrode disposed on a side of the inside frame body of the second case, wherein:
at least one of the first metal electrode and the second metal electrode is disposed inside the inside frame body, and
the first case and the second case are combined such that the inside frame bodies are faced inward to form the space between the first metal electrode and the second metal electrode.

4. The metal-air battery according to claim 1, wherein the air electrodes are formed into a single air electrode having a tubular shape, or the air electrodes are formed into a single air electrode having a tubular shape wherein a part of the tubular shape is chipped.

5. A metal-air battery comprising:
a case;
an air electrode disposed in the case and connecting with a positive terminal of the battery, the air electrode having a tubular shape or a shape where a part of the tubular shape is chipped; and
a metal electrode disposed inwardly and separately from the air electrode, the metal electrode connecting with a negative terminal of the battery and having a tubular shape or a shape where a part of the tubular shape is chipped, and the metal electrode and the air electrode connected to the terminals producing battery power when discharging, wherein
an outer surface of the air electrodes is aerially exposed, the metal electrode has a tubular inside as a first space, the metal electrode is separated from the air electrode by a second space;
the first space of the tubular inside and the second space between the metal electrode and the air electrode communicate with each other, and
the first space and the second space are filled with electrolyte injected in the case.

6. The metal-air battery according to claim 1, wherein the metal electrodes are removably mounted on the case.

7. The metal-air battery according to claim 1, wherein the metal electrodes each have a slit or a hole passing from an inside to an outside of the metal electrode.

8. The metal-air battery according to claim 1, wherein the metal electrodes are each provided with one end portion and another end portion, the one end portion being a fixed end fixed to a side of the case, the other end portion being a free end.

9. The metal-air battery according to claim 1, wherein a metal that constitutes each metal electrode is magnesium or a magnesium alloy.

* * * * *